US011473496B2

(12) United States Patent
Romero et al.

(10) Patent No.: US 11,473,496 B2
(45) Date of Patent: Oct. 18, 2022

(54) TRANSIENT OPERATION CONTROL OF A HYBRID GAS TURBINE ENGINE

(71) Applicant: United Technologies Corporation, Farmington, CT (US)

(72) Inventors: Michael M. Romero, Manchester, CT (US); Michael Hrach, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 179 days.

(21) Appl. No.: 16/782,116

(22) Filed: Feb. 5, 2020

(65) Prior Publication Data
US 2020/0248619 A1 Aug. 6, 2020

Related U.S. Application Data

(60) Provisional application No. 62/801,183, filed on Feb. 5, 2019.

(51) Int. Cl.
F02C 6/00 (2006.01)
F01D 15/10 (2006.01)
(Continued)

(52) U.S. Cl.
CPC ............... F02C 6/00 (2013.01); F01D 15/10 (2013.01); F02C 7/32 (2013.01); F02C 9/18 (2013.01);
(Continued)

(58) Field of Classification Search
CPC ............ F02C 3/113; F02C 6/00; F02C 7/268; F02C 7/32; F02C 7/36; F02C 9/18; F01D 15/10;
(Continued)

(56) References Cited

U.S. PATENT DOCUMENTS

2005/0103931 A1* 5/2005 Morris ............... F02C 6/08 244/58
2017/0226934 A1 8/2017 Robic et al.
(Continued)

FOREIGN PATENT DOCUMENTS

| EP | 2728141 A2 | 5/2014 |
| EP | 3421760 A1 | 1/2019 |
| FR | 3056558 A1 | 3/2018 |

OTHER PUBLICATIONS

EP Application No. 20155630.5 Extended EP Search Report dated Jul. 1, 2020, 6 pages.

Primary Examiner — Loren C Edwards
(74) Attorney, Agent, or Firm — Cantor Colburn LLP

(57) ABSTRACT

A hybrid engine includes a gas turbine engine having at least one compressor section and at least one turbine section operably coupled to a shaft. The hybrid engine includes an electric motor configured to augment rotational power of the shaft of the gas turbine engine. A controller is operable to monitor for a transient operation request of the hybrid engine, provide the transient operation request to one or more management systems of the hybrid engine to determine whether one or more faults are detected by the one or more management systems, modify one or more stall margin adjustment parameters of the gas turbine engine based on detecting the one or more faults by the one or more management system, and adjust operation of the hybrid engine based on the one or more stall margin adjustment parameters.

14 Claims, 6 Drawing Sheets

(51) Int. Cl.
  *F02C 7/32*    (2006.01)
  *F02C 9/18*    (2006.01)
  *B64D 27/02*   (2006.01)

(52) U.S. Cl.
  CPC .................. *B64D 2027/026* (2013.01); *F05D 2220/323* (2013.01); *F05D 2220/76* (2013.01); *F05D 2270/04* (2013.01); *F05D 2270/101* (2013.01); *F05D 2270/304* (2013.01)

(58) Field of Classification Search
  CPC ........... B64D 2027/026; F05D 2270/04; F05D 2270/101; F05D 2270/102; F05D 2270/303; F05D 2270/304; F05D 2220/323; F05D 2220/76
  See application file for complete search history.

(56) References Cited

U.S. PATENT DOCUMENTS

2018/0178920 A1   6/2018  Swann et al.
2018/0370646 A1*  12/2018 Hon ..................... B64D 27/18

\* cited by examiner

TRANSIENT OPERATION CONTROL OF A HYBRID GAS TURBINE ENGINE

CROSS-REFERENCE TO RELATED APPLICATION

This application claims the benefit of priority to U.S. Provisional Application No. 62/801,183 filed Feb. 5, 2019, the disclosure of which is incorporated herein by reference in its entirety.

BACKGROUND

The subject matter disclosed herein generally relates to rotating machinery and, more particularly, to a method and an apparatus for transient operation control of a hybrid gas turbine engine.

Surge and rotating stalls (herein referred to simply as surge or stall) are oscillatory fluid mechanic instabilities of a compression system and thus endemic to all compressors. Surge should be avoided since it reduces the thrust of an engine, induces high temperatures, large mechanical stresses and deflections, can shut the engine down, and in some cases result in a catastrophic failure. Compressors are typically designed and installed with a goal of avoiding the so-called "surge line", which marks the operational boundary for instability inception. Control laws for gas turbine engines are typically designed to avoid actions that could induce surge under normal operating conditions. Operating compressors close to the surge line typically results in increased engine operating efficiency.

BRIEF DESCRIPTION

According to one embodiment, a hybrid engine includes a gas turbine engine having at least one compressor section and at least one turbine section operably coupled to a shaft. The hybrid engine includes an electric motor configured to augment rotational power of the shaft of the gas turbine engine. A controller monitors for a transient operation request of the hybrid engine, provides the transient operation request to one or more management systems of the hybrid engine, and determines whether one or more faults are detected by the one or more management systems. The controller modifies one or more stall margin adjustment parameters of the gas turbine engine based on detecting the one or more faults by the one or more management systems and adjusts the operation of the hybrid engine based on the one or more stall margin adjustment parameters.

In addition to one or more of the features described above or below, or as an alternative, further embodiments may include one or more management systems including a thermal management system configured to monitor the operating temperature of the electrical system. The electrical system may include the battery or alternative power source, the power electronics, and the electrical motors. The thermal management system may detect one or more thermal faults based on a temperature associated with the alternative power source, the power electronics, and/or the electrical motors by exceeding or approaching a temperature threshold.

In addition to one or more of the features described above or below, or as an alternative, further embodiments may include one or more management systems including a battery management system configured to monitor a voltage or current sourcing capability of the battery and/or alternative power source for the electric motor. The battery management system may detect one or more faults including a battery or alternative power source fault based on the voltage or current sourcing capability of the battery system being below a power threshold.

In addition to one or more of the features described above or below, or as an alternative, further embodiments may include one or more management systems including an electrical augmentation management system configured to monitor one or more capabilities of the electric motor. The electrical augmentation management system may detect one or more faults including an electrical augmentation fault based on at least one of the capabilities of the electric motor not meeting a performance threshold.

In addition to one or more of the features described above or below, or as an alternative, further embodiments may include one or more stall margin adjustment parameters including an adjustment to an acceleration schedule or a separate acceleration schedule for the gas turbine engine to reference.

In addition to one or more of the features described above or below, or as an alternative, further embodiments may include an adjustment to the acceleration schedule, modulated with respect to the reduced performance capability from the one or more management systems.

In addition to one or more of the features described above or below, or as an alternative, further embodiments may include one or more stall margin adjustment parameters including an adjustment to an engine bleed schedule or a separate engine bleed schedule of the gas turbine engine.

In addition to one or more of the features described above or below, or as an alternative, further embodiments may include an adjustment to the engine bleed schedule or a separate engine bleed schedule based on an indication of a reduced performance capability from the one or more management systems.

In addition to one or more of the features described above or below, or as an alternative, further embodiments may include one or more stall margin adjustment parameters including an adjustment to an acceleration schedule of the gas turbine engine, and the adjustment to the engine bleed schedule which are balanced with respect to a reduced power augmentation level provided by the electric motor.

According to an embodiment, a hybrid engine includes a gas turbine engine, first electric motor, a second electric motor, and means for modifying one or more stall margin adjustment parameters of the gas turbine engine based on detecting one or more faults of the hybrid engine. The gas turbine engine includes a low speed spool with a low pressure compressor operably coupled to a low pressure turbine and a high speed spool with a high pressure compressor operably coupled to a high pressure turbine. The first electric motor is configured to augment rotational power of the low speed spool, and the second electric motor is configured to augment rotational power of the high speed spool.

In addition to one or more of the features described above or below, or as an alternative, further embodiments may include the means for modifying one or more stall margin adjustment parameters including a controller operable to monitor for a transient operation request of the hybrid engine, provide the transient operation request to one or more management systems of the hybrid engine to determine whether the one or more faults are detected by the one or more management systems, modify the one or more stall margin adjustment parameters of the gas turbine engine based on detecting the one or more faults by the one or more management systems, and adjust operation of the hybrid engine based on the one or more stall margin adjustment parameters.

In addition to one or more of the features described above or below, or as an alternative, further embodiments may include the one or more stall margin adjustment parameters associated with the high speed spool and the one or more faults associated with the second electric motor.

In addition to one or more of the features described above or below, or as an alternative, further embodiments may include the one or more management systems including a thermal management system configured to monitor an operating temperature of a battery system for the second electric motor, the one or more faults that comprise of a thermal fault based on a temperature associated with the battery system and electronics exceeding or approaching a temperature threshold, the one or more management systems including a battery management system configured to monitor a voltage or current sourcing capability of the battery system for the second electric motor, and the one or more faults including a battery fault based on the voltage or current sourcing capability of the battery system or external power source system being below a power threshold.

In addition to one or more of the features described above or below, or as an alternative, further embodiments may include one or more management systems including an electrical augmentation management system configured to monitor one or more capabilities of the second electric motor, and the one or more faults including an electrical augmentation fault based on at least one of the capabilities of the second electric motor not meeting a performance threshold.

In addition to one or more of the features described above or below, or as an alternative, further embodiments may include one or more stall margin adjustment parameters including an adjustment to an acceleration schedule or reference to an auxiliary acceleration schedule of the gas turbine engine and/or an adjustment to an engine bleed schedule or reference of an auxiliary bleed schedule of the gas turbine engine.

In addition to one or more of the features described above or below, or as an alternative, further embodiments may include an adjustment to the acceleration schedule and an adjustment to the engine bleed schedule which are balanced with respect to a reduced power augmentation level provided by the second electric motor.

In one various embodiment, a method includes monitoring, by a controller, for a transient operation request of a hybrid engine including an electric motor configured to augment rotational power of a high speed spool of a hybrid gas turbine engine. The method also includes providing the transient operation request to one or more management systems of the hybrid engine to determine whether one or more faults are detected by the one or more management systems and modifying one or more stall margin adjustment parameters of the gas turbine engine based on detecting the one or more faults by the one or more management systems. Operation of the hybrid engine is adjusted based on the one or more stall margin adjustment parameters.

A technical effect of the apparatus, systems and methods is achieved by monitoring for faults prior to transient operation of a hybrid gas turbine engine and modifying one or more stall margin adjustment parameters to increase stall margin when one or more faults are detected.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
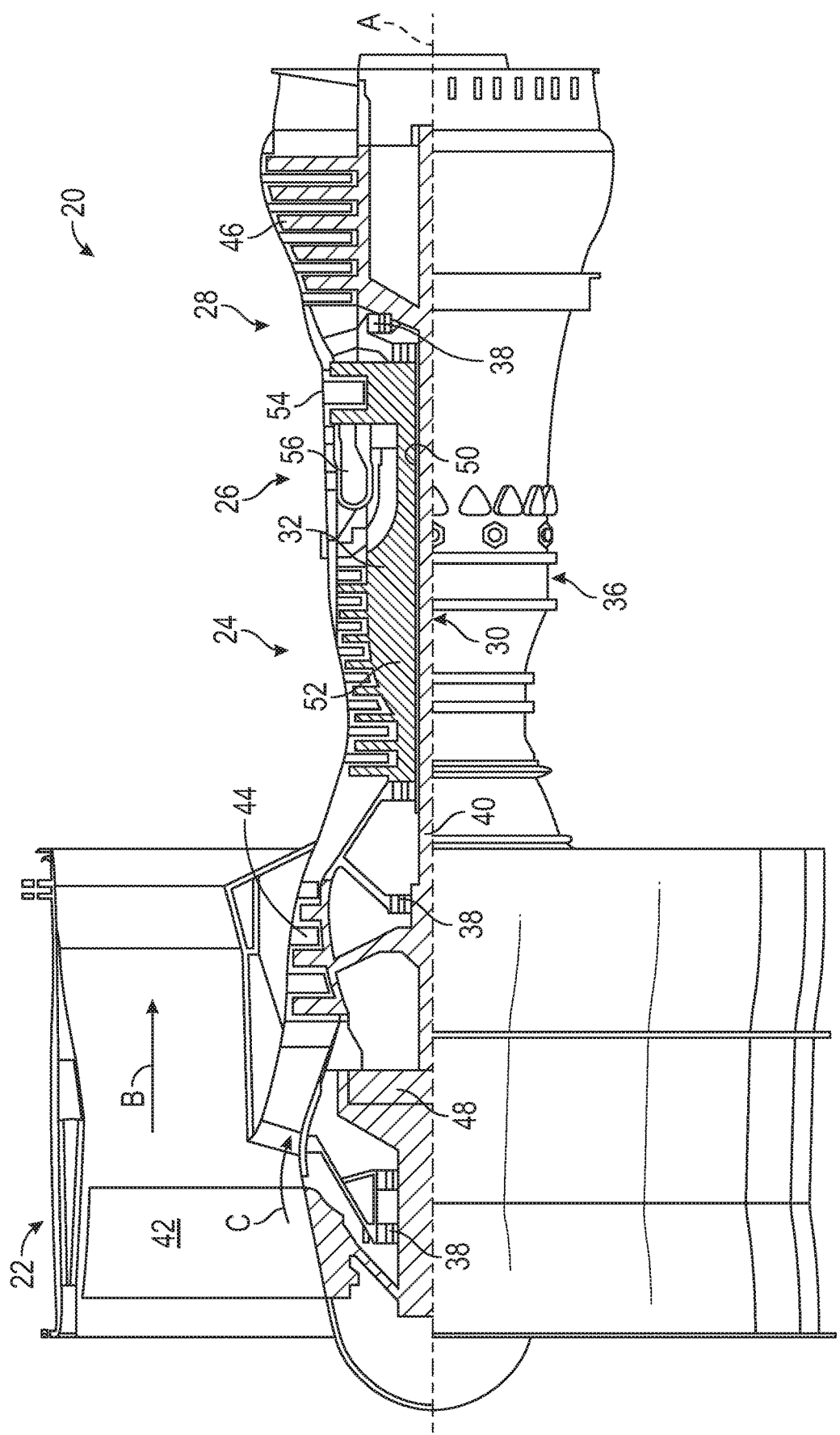
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool geared turbofan gas turbine engine in the disclosed non-limiting embodiment, it should be understood that the concepts described herein are not limited to use with two-spool geared turbofans as the teachings may be applied to other types of turbine engines including direct drive, single-spool, or three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
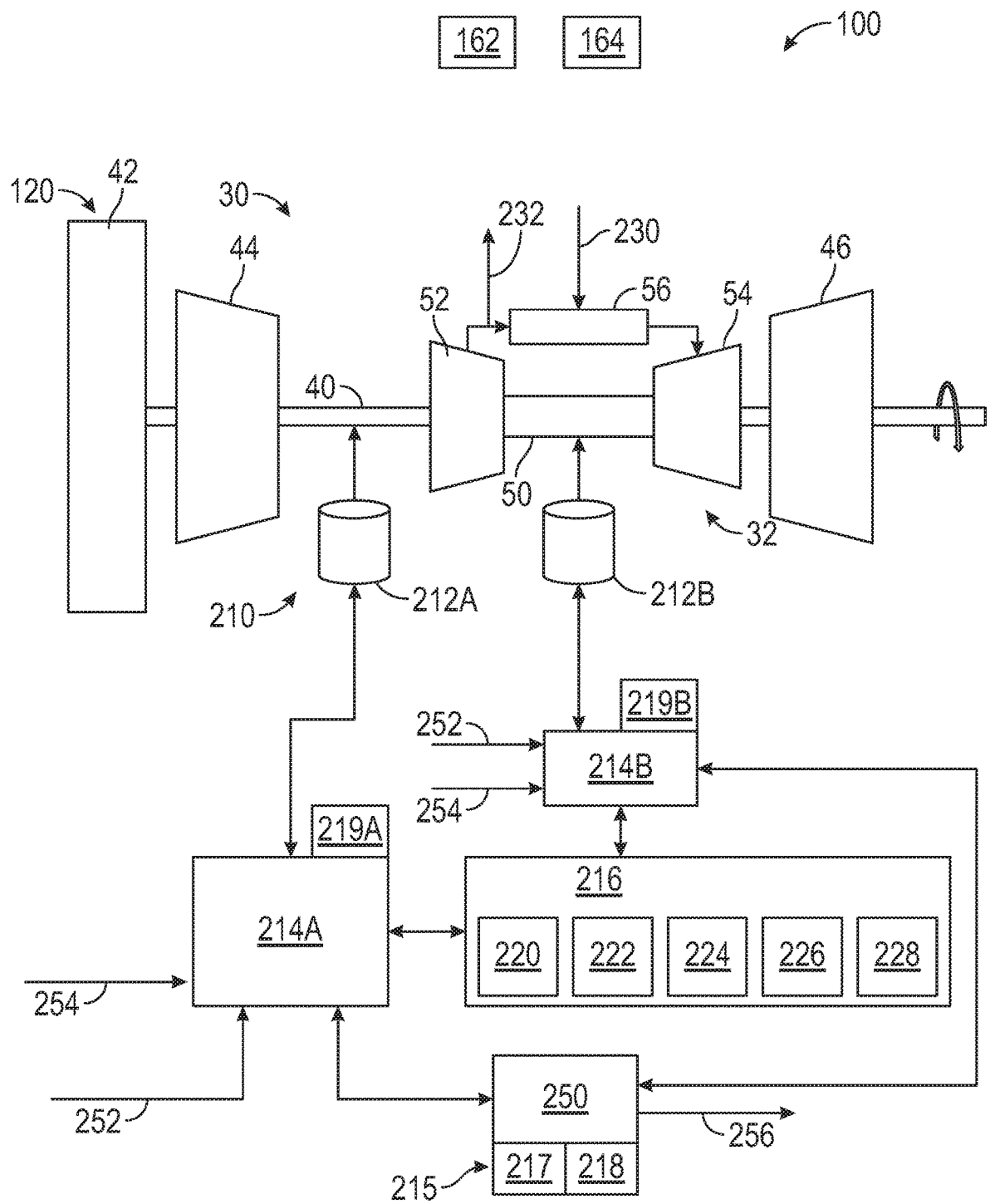
FIG. 2 is a schematic diagram of a hybrid engine, in accordance with an embodiment of the disclosure.

FIG. 2 illustrates a hybrid engine 100 (also referred to as hybrid gas turbine engine 100) including a gas turbine engine 120 operably coupled to an electrical augmentation system 210 as part of a hybrid electric aircraft. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50). The electrical augmentation system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor or additional electric motors (not depicted). In some embodiments, the electric motors 212A, 212B can be configured as a motor or a generator depending upon an operational mode or system configuration.

The electrical augmentation system 210 can also include converter electronics 214A, 241B operable to condition current to/from the electric motors 212A, 212B. In some embodiments, the electric motors 212A, 212B can be configured in a generator mode to charge a battery system 250 and in a motor mode to provide supplemental rotation force to shafts 40, 50 of low speed spool 30 and high speed spool 32 respectively. The electric motors 212A, 212B can include conventional motor and/or generator components, such as a rotor and stator, including a plurality of windings and/or permanent magnets. The converter electronics 214A, 214B can also include conventional current control electronics, such as filters, switching components, rectifiers, inverters, voltage converters, sensors, and the like. In some embodiments, one of the electric motors 212A, 212B may be operable as a starter motor to partially or completely power rotation of the shafts 40, 50 in a starting mode of operation (e.g., to start the gas turbine engine 120) and/or can provide supplemental power to the shafts 40, 50 during various flight phases. Other uses and functions for the electric motors 212A, 212B are contemplated.

The converter electronics 214A, 214B can control charging of the battery system 250 responsive to a controller 216. The controller 216 can enable a flow of a charging current from the electric motors 212A, 212B or a power input 252 to charge the battery system 250 as regulated and conditioned through the converter electronics 214A, 214B. The power input 252 can be an external input, such as power received through a plug interface, e.g., at a gate or service location. In some embodiments, the converter electronics 214A, 214B may receive electric current from an auxiliary power input 254 to provide a supplemental or alternative power source for charging the battery system 250. For instance, the auxiliary power input 254 may receive electric current from an auxiliary power unit (not depicted) or another instance of the gas turbine engine 120. The charge stored in the battery system 250 can provide an electric current for a propulsion system use 256, which may include powering one or more of the electric motors 212A, 212B and/or other electric loads (not depicted) during various operational states. The propulsion system use 256 can be part of the gas turbine engine 120 or another aircraft system, such as another instance of the gas turbine engine 120 on the same hybrid electric aircraft.

In embodiments, the controller 216 can control and monitor for fault conditions of the gas turbine engine 120 and/or the electrical augmentation system 210. For example, the controller 216 can be integrally formed or otherwise in communication with a full authority digital engine control (FADEC) of the gas turbine engine 120. In embodiments, the controller 216 can include a processing system 220, a memory system 222, and an input/output interface 224. The controller 216 can also include various operational control schedules, such as an acceleration schedule 226 that controls fuel flow 230 to the combustor 56 based on one or more speeds, pressure ratios, or other values. The controller 216 can also include an engine bleed schedule 228 that defines when one or more engine bleeds 232 should be opened, which may release heated and compressed air prior to combustion for an environmental control system 162, an anti-ice system 164, or other use (or overboard). The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more system sensors (not depicted) and interface with the converter electronics 214A, 214B and/or other systems (not depicted).

The controller 216 is operable to monitor for a transient operation request of the hybrid engine 100. The transient operation request can include monitoring for an acceleration event based on a rate of change in speed, throttle, or other parameters. The transient operation request can be provided to one or more management systems 215 of the hybrid engine 100 to determine whether one or more faults are detected by the one or more management systems 215. The management systems 215 can include various systems that can detect fault conditions of the hybrid engine 100 that may affect a stall margin of the gas turbine engine 120 upon an acceleration event. Examples of the management systems 215 can include a thermal management system 217, a battery management system 218, and an electrical augmentation management system 219A, 219B. Fewer or additional management systems 215 can be incorporated, combined, or removed in embodiments.

With respect to the example of FIG. 2, the thermal management system 217 can be associated with the battery system 250 and/or each of the converter electronics 214A, 214B to monitor an operating temperature and detect a thermal fault based on a temperature exceeding a temperature threshold. For example, temperatures above a maximum limit may reduce effectiveness or damage the battery system 250 and/or the converter electronics 214A, 214B. As another example, the thermal management system 217 can determine whether a monitored temperature is below a minimum limit. In some embodiments, the thermal management system 217 can include heaters and/or coolers to adjust a localized temperature of the battery system 250 and/or the converter electronics 214A, 214B.

The battery management system 218 can be configured to monitor a voltage or current sourcing capability of the battery system 250 or other alternative power source for the electric motors 212A, 212B. The alternative power source can be any device or subsystem from which power can be drawn, such as an external power source system (e.g., a smaller engine, fuel cell, a generator, etc.). The battery management system 218 can detect one or more faults associated with the battery system 250, such as a battery fault based on the voltage or current sourcing capability of the battery system 250 being below or approaching a power threshold. There can be multiple power thresholds depending upon a planned duration of use and whether both of the electric motors 212A, 212B can be used at the same time. For instance, in a reduced power state, the first electric motor 212A may be disabled while the second electric motor 212B is enabled for use. Further, the electric motors 212A, 212B may be limited to a lower capacity in a reduced power mode, such as capped at 20% to 80% maximum operating capacity.

The electrical augmentation management system 219A, 219B can be configured to monitor one or more capabilities of the electric motors 212A, 212B associated with each of the converter electronics 214A, 214B. For example, the electrical augmentation management system 219A, 219B can determine whether an electrical augmentation fault exists based on at least one of the capabilities of the electric motor 212A, 212B not meeting a performance threshold. Monitoring by the electrical augmentation management system 219A, 219B can include back-electromagnetic force checks, continuity and short circuit tests of motor windings and/or circuitry of the converter electronics 214A, 214B, for example.

Figure 3:
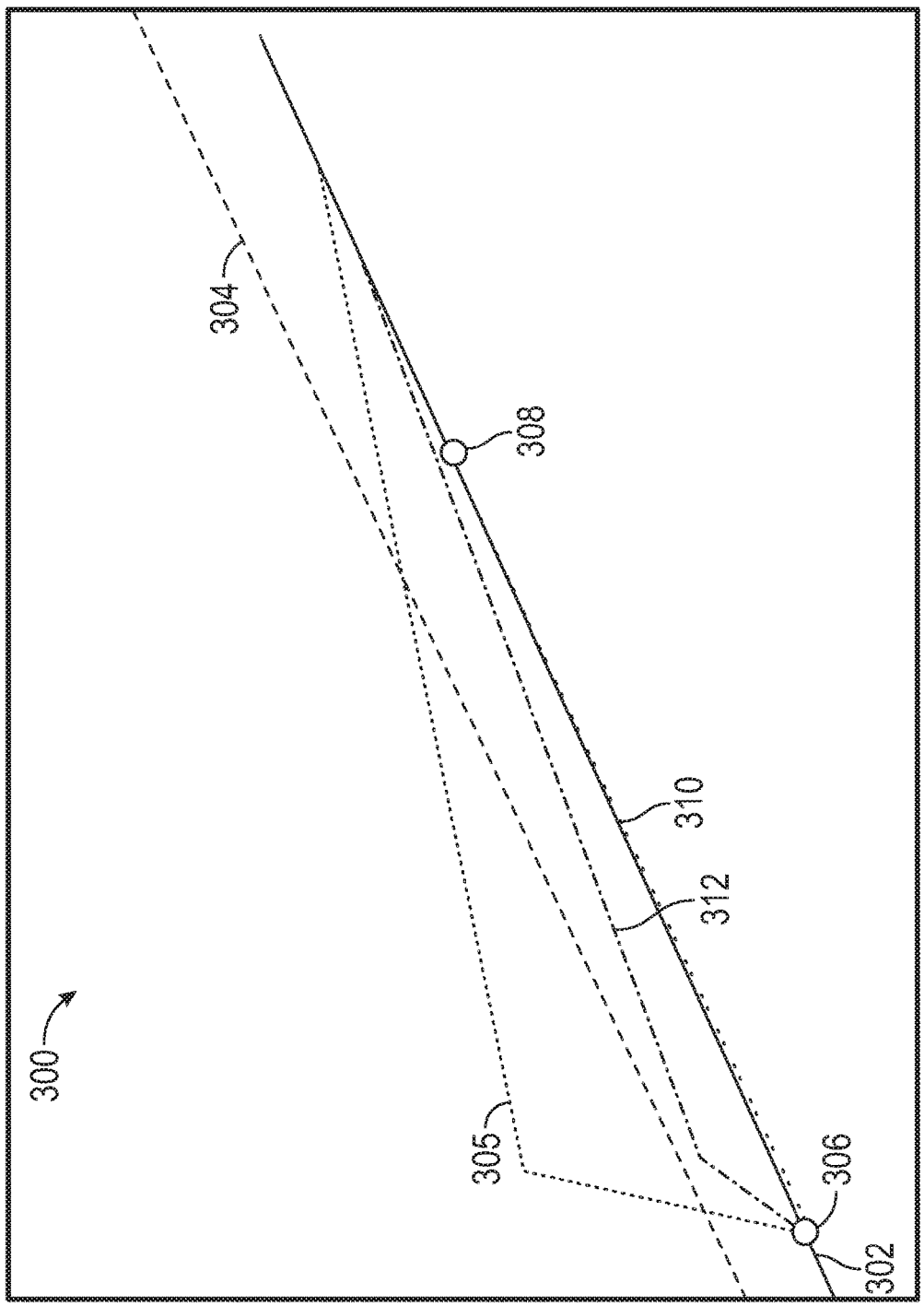
FIG. 3 is a high pressure compressor operating line plot, in accordance with an embodiment of the disclosure.

Referring now to FIG. 3, a high pressure compressor operating line plot 300 is depicted according to an embodiment. The example of FIG. 3 illustrates how the gas turbine engine 120 of FIG. 2 may perform under various conditions during an acceleration. A steady-state operating line 302 illustrates a change in pressure ratio of the high pressure compressor 52 versus a corrected flow (pounds per second) of the high pressure compressor 52 for normalized operating conditions as both values would steadily rise during a slow acceleration in power setting induced by fuel addition into the combustor. The slow acceleration can be an "infinitely" slow acceleration where the time to accelerate from one point to the next on the operating line goes to infinity in a limit sense by following the steady-state operating line, as any faster acceleration would deviate from the steady-state operating line. A stall line boundary 304 is defined as an upper compressor stability limit for the hybrid engine 100. The stall line can be close to the operating line as compared to a conventional gas turbine engine. A conventional gas turbine engine can require much more stability margin (e.g., the distance from the operating line to the stall line) to account for a transient acceleration with no operating line control. Since high spool augmentation can provide an ability to manage operating line, less stability margin can be included in the design of a hybrid gas turbine engine. The stall line margin can be allocated to increase efficiency, e.g., reducing the solidity of the compressor. If the electric motor 212B of the high speed spool 32 fails and no corrective action is taken, a transient acceleration condition 305 may exceed the stall line boundary 304, which may result in a localized stall or surge. A transient condition accelerating between operating points 306 and 308 depicts a targeted control condition 310 while the hybrid engine 100 operates in a non-fault (normal) state that may or may not align with the steady-state operating line 302. In embodiments, the controller 216 of FIG. 2 can modify one or more stall margin adjustment parameters of the gas turbine engine 120 based on detecting one or more faults and adjust operation of the hybrid engine 100 based on the one or more stall margin adjustment parameters. During operation with a fault detected in the high spool electrical assist, the modification of the one or more stall margin adjustment parameters can result in a slowed transient response 312 of the transient acceleration condition 305 below the stall line boundary 304. One or more adjustments to elements of the hybrid engine 100 can be implemented to achieve the slowed transient response 312, such as reduced power operation of electric motor 212B or adjustments/rescaling of the acceleration schedule 226 and/or engine bleed schedule 228 of FIG. 2.

Figure 4:
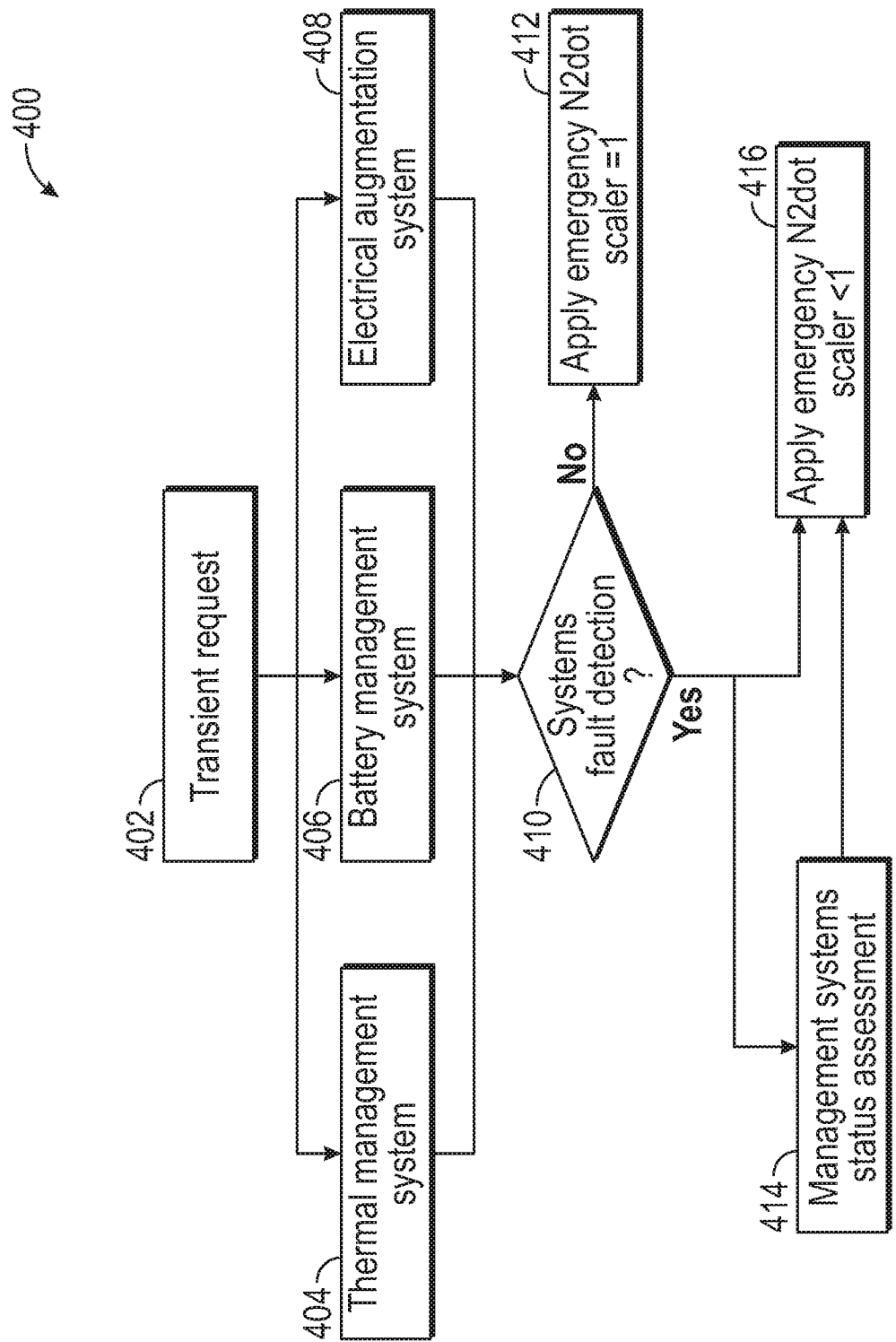
FIG. 4 is a flow chart illustrating a method, in accordance with an embodiment of the disclosure.

Referring now to FIG. 4 with continued reference to FIGS. 1-3, FIG. 4 is a flow chart illustrating a method 400 for transient operation control of a hybrid engine, in accordance with an embodiment. The method 400 may be performed, for example, by the hybrid engine 100 of FIG. 2. For purposes of explanation, the method 400 is described primarily with respect to the hybrid engine 100 of FIG. 2; however, it will be understood that the method 400 can be performed on other configurations (not depicted).

A transient request 402 can be received at the controller 216 and is passed to a plurality of management systems, such as a thermal management system 404, a battery management system 406, and/or an electric augmentation management system 408. The thermal management system 404, battery management system 406, and/or electric augmentation management system 408 are embodiments of the thermal management system 217, battery management system 218, and electric augmentation management system 219A, 219B of FIG. 2. The transient request 402 can be received as a command on an aircraft or engine system bus, such as a thrust command or pilot lever angle command.

At block 410, the controller 216 can determine whether a fault was detected by at least one of the management systems, such as a thermal management system 404, a battery management system 406, and/or an electric augmentation management system 408. Based on determining that no faults were detected, an emergency N2dot scaler 412 with a value of one can be applied to the acceleration schedule 226 to maintain nominal acceleration operation, such as targeted control condition 310. The emergency N2dot scaler 412 can be used to set or reset adjusts to acceleration schedule 226. If at least one fault was detected at block 410, a management systems status assessment 414 can be performed and an emergency N2dot scaler 416 with a value of less than one can be applied to the acceleration schedule 226 to adjust acceleration operation for a degraded transient response, such as a slowed transient response 312 of the transient acceleration condition 305 below the stall line boundary 304. The emergency N2dot scaler 416 with a value of less than one can reduce a rate of change in the speed of the shaft 50 as compared to normal operation, thereby reducing a compressor surge risk. The management systems status assessment 414 can determine whether components monitored by the thermal management system 404, battery management system 406, and/or electric augmentation management system 408 are at least partially operable to balance a modification of the acceleration schedule 226 with a performance adjustment to the electrical augmentation system 210 (e.g., a reduced contribution by the electric motors 212A, 212B).

Figure 5:
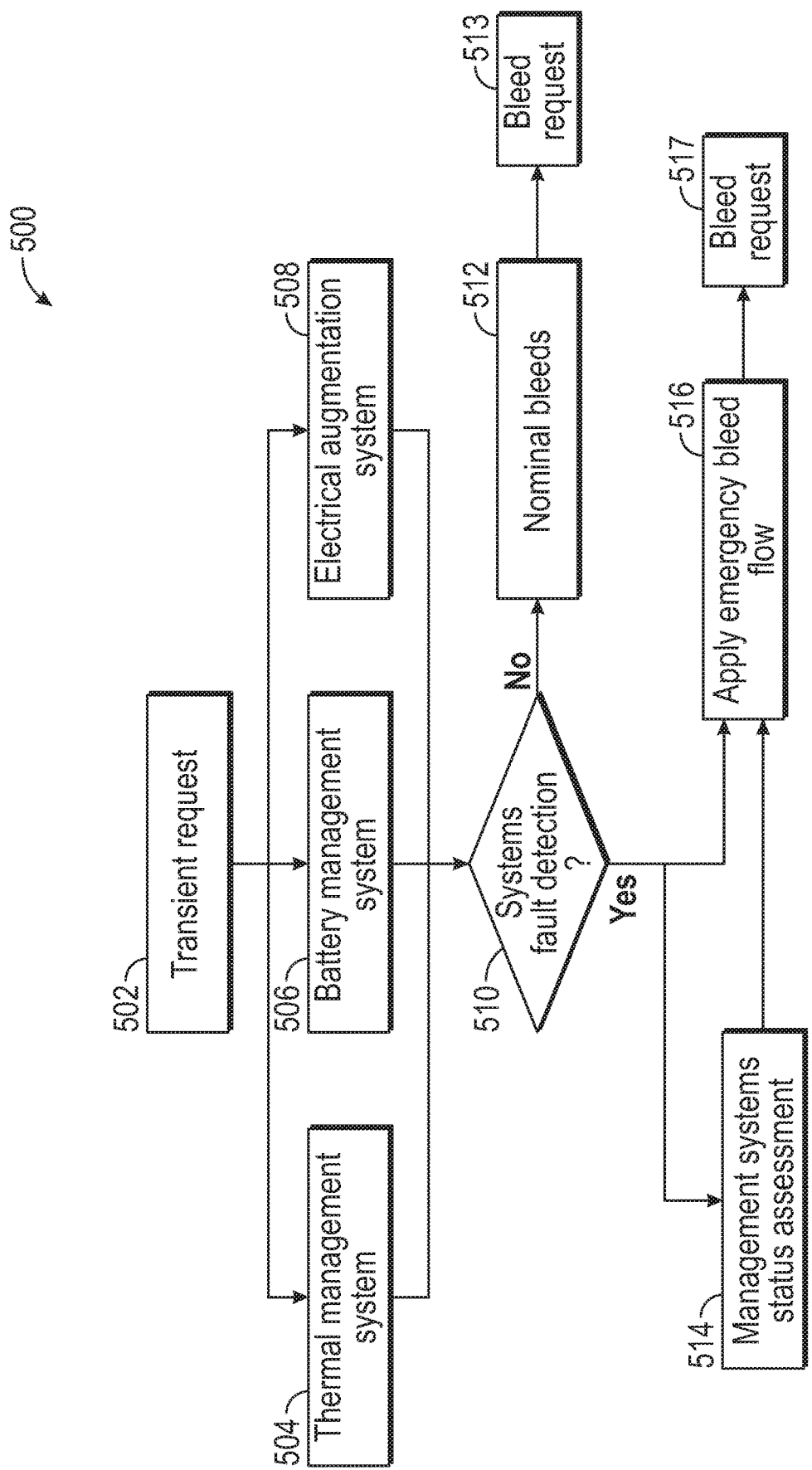
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for transient operation control of a hybrid engine, in accordance with an embodiment. The method 500 may be performed, for example, by the hybrid engine 100 of FIG. 2. For purposes of explanation, the method 500 is described primarily with respect to the hybrid engine 100 of FIG. 2; however, it will be understood that the method 500 can be performed on other configurations (not depicted).

A transient request 502 can be received at the controller 216 and is passed to a plurality of management systems, such as a thermal management system 504, a battery management system 506, and/or an electric augmentation management system 508. The thermal management system 504, battery management system 506, and/or electric augmentation management system 508 are embodiments of the thermal management system 217, battery management system 218, and electric augmentation management system 219A, 219B of FIG. 2. The transient request 502 can be received as a command on an aircraft or engine system bus, such as a thrust command or pilot lever angle command.

At block 510, the controller 216 can determine whether a fault was detected by at least one of the management systems, such as a thermal management system 504, a battery management system 506, and/or an electric augmentation management system 508. Based on determining that no faults were detected, nominal bleeds 512 can be maintained as a bleed request 513 to one or more engine bleeds 232, for instance, according to the engine bleed schedule 228. The bleed request 513 can open or close one or more engine bleed valves at various stations within the gas turbine engine 120. If at least one fault was detected at block 510, a management systems status assessment 514 can be performed and an emergency bleed flow 516 can be used as a bleed request 517 that modifies the engine bleed schedule 228. The bleed request 517 can open one or more engine bleeds 232 to reduce the high pressure compressor 52 pressure ratio. The management systems status assessment 514 can determine whether components monitored by the thermal management system 504, battery management system 506, and/or electric augmentation management system 508 are at least partially operable to balance a modification of the engine bleed schedule 228 with a performance adjustment to the electrical augmentation system 210 (e.g., a reduced contribution by the electric motors 212A, 212B). Further, modification of the engine bleed schedule 228 can be combined with modification of the acceleration schedule 226 to produce the slowed transient response 312 of the transient acceleration condition 305 below the stall line boundary 304.

Figure 6:
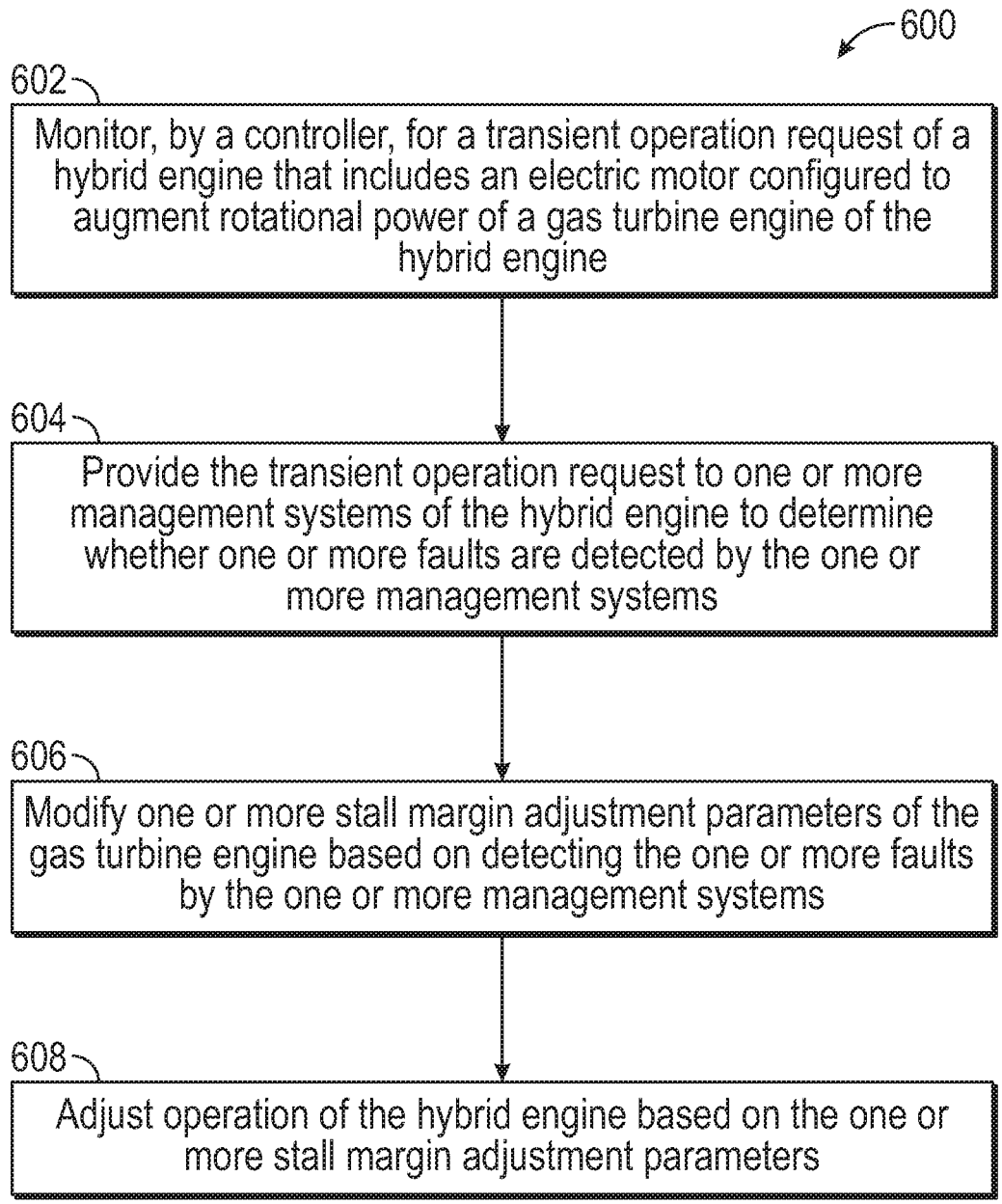
FIG. 6 is a flow chart illustrating a method, in accordance with an embodiment of the disclosure.

Referring now to FIG. 6 with continued reference to FIGS. 1-5, FIG. 6 is a flow chart illustrating a method 600 for transient operation control of a hybrid engine, in accordance with an embodiment. The method 600 may be performed, for example, by the hybrid engine 100 of FIG. 2. For purposes of explanation, the method 600 is described primarily with respect to the hybrid engine 100 of FIG. 2; however, it will be understood that the method 600 can be performed on other configurations (not depicted).

At block 602, controller 216 can monitor for a transient operation request of the hybrid engine 100, such as the transient request 402, 502. At block 604, the controller 216 can provide the transient operation request to one or more management systems 215 of the hybrid engine 100 to determine whether one or more faults are detected by the one or more management systems 215. At block 606, the controller 216 can modify one or more stall margin adjustment parameters of the gas turbine engine 120 based on detecting the one or more faults by the one or more management system 215. At block 608, the controller 216 can adjust operation of the hybrid engine 100 based on the one or more stall margin adjustment parameters.

In embodiments, the one or more management systems 215 can include a thermal management system 217 configured to monitor an operating temperature of a battery system 250 for the electric motor 212A, 212B, and the one or more faults can include a thermal fault based on a temperature associated with the battery system 250 exceeding a temperature threshold. The one or more management systems 215 can include a battery management system 218 configured to monitor a voltage or current sourcing capability of the battery system 250 or other alternative power source for the electric motor 212A, 212B, and the one or more faults can include a battery fault based on the voltage or current sourcing capability of the battery system 250 being below or approaching a power threshold. The alternative power source can be any device or subsystem from which power can be drawn. The one or more management systems 215 can include an electrical augmentation management system 219A, 219B configured to monitor one or more capabilities of the electric motor 212A, 212B, and the one or more faults can include an electrical augmentation fault based on at least one of the capabilities of the electric motor 212A, 212B not meeting a performance threshold. The one or more stall margin adjustment parameters can include an adjustment to an acceleration schedule 226 or a separate acceleration schedule of the gas turbine engine 120 to reference (also referred to as an auxiliary acceleration schedule or reference acceleration schedule). Further, the one or more stall margin adjustment parameters can include an adjustment to an engine bleed schedule 228 or a separate engine bleed schedule for the gas turbine engine 120 to reference (also referred to as an auxiliary bleed schedule or reference bleed schedule). The adjustment to the acceleration schedule 226 and the adjustment to the engine bleed schedule 228 can be balanced with respect to a reduced power augmentation level provided by the electric motor 212A, 212B. For example, the adjustments can be modulated or established with respect to a reduced performance capability from the one or more management systems 215.

While the above description has described the flow process of FIG. 6 in a particular order, it should be appreciated that unless otherwise specifically required in the attached claims that the ordering of the steps may be varied. Also, it is clear to one of ordinary skill in the art that, the stability enhancement provided by the dynamic torque and power capability of the coupled electric motor system described herein can be combined with and enhance other surge control features, such as surge control valves, variable stators, and fuel flow control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid engine comprising:
   a gas turbine engine comprising at least two spools, each spool comprising at least one compressor section and at least one turbine section operably coupled to a shaft;
   an first electric motor configured to augment rotational power of a first spool of the at least two spools of the gas turbine engine;
   a second electric motor configured to augment rotational power of a second spool of the at least two spools of the gas turbine engine; and
   a controller operable to:
      monitor for a transient operation request of the hybrid engine;
      provide the transient operation request to one or more management systems of the hybrid engine to determine whether one or more faults are detected by the one or more management systems;
      modify two or more stall margin adjustment parameters of the gas turbine engine based on detecting the one or more faults by the one or more management systems, wherein the two or more stall margin adjustment parameters comprise an adjustment to an acceleration schedule or a use of another reference acceleration schedule of the gas turbine engine and an adjustment to an engine bleed schedule or a use of another reference bleed schedule of the gas turbine engine; and
      adjust operation of the hybrid engine based on the two or more stall margin adjustment parameters, wherein the adjustment to the acceleration schedule or the use of the another reference acceleration schedule and the adjustment to the engine bleed schedule or the use of the another reference bleed schedule are adjusted with respect to a reduced power augmentation level provided by the second electric motor.

2. The hybrid engine of claim 1, wherein the one or more management systems comprise a thermal management system configured to monitor an operating temperature of a battery system, power electronics, and/or other power sources for the second electric motor, and the one or more faults comprise a thermal fault based on a temperature associated with the battery system, power electronics, and/or other power sources exceeding or approaching a temperature threshold.

3. The hybrid engine of claim 2, wherein the one or more management systems comprise a battery management system configured to monitor a voltage or current sourcing capability of the battery system or other power sources for the second electric motor, and the one or more faults comprise a battery fault based on the voltage or current sourcing capability of the battery system being below or approaching a power threshold.

4. The hybrid engine of claim 3, wherein the one or more management systems comprise an electrical augmentation management system configured to monitor one or more capabilities of the second electric motor, and the one or more faults comprise an electrical augmentation fault based on at least one of the capabilities of the second electric motor not meeting a performance threshold.

5. The hybrid engine of claim 1, wherein the adjustment to the acceleration schedule or the use of the another reference acceleration schedule is modulated based on an indication of a reduced performance capability from the one or more management systems.

6. The hybrid engine of claim 1, wherein the adjustment to the engine bleed schedule or the use of the another reference bleed schedule is established based on an indication of a reduced performance capability from the one or more management systems.

7. The hybrid engine of claim 1, wherein the one or more stall margin adjustment parameters include the adjustment to the acceleration schedule, and the acceleration schedule is adjusted with respect to the reduced power augmentation level provided by the second electric motor.

8. The hybrid engine of claim 1, wherein the one or more stall margin adjustment parameters include the use of the another reference acceleration schedule of the gas turbine engine, and the use of the another reference acceleration schedule is adjusted with respect to the reduced power augmentation level provided by the second electric motor.

9. The hybrid engine of claim 1, wherein the one or more stall margin adjustment parameters include the adjustment to the engine bleed schedule, and the engine bleed schedule is adjusted with respect to the reduced power augmentation level provided by the second electric motor.

10. The hybrid engine of claim 1, wherein the one or more stall margin adjustment parameters include the use of the another reference bleed schedule of the gas turbine engine, and the use of the another reference bleed schedule is adjusted with respect to the reduced power augmentation level provided by the second electric motor.

11. A method comprising:
monitoring, by a controller, for a transient operation request of a hybrid engine comprising an first electric motor configured to augment rotational power of a first spool of a gas turbine engine of the hybrid engine and a second electric motor configured to augment rotational power of a second spool of the gas turbine engine, wherein the gas turbine engine comprises at least two spools, each spool comprising at least one compressor section and at least one turbine section operably coupled to a shaft;
providing the transient operation request to one or more management systems of the hybrid engine to determine whether one or more faults are detected by the one or more management systems;
modifying two or more stall margin adjustment parameters of the gas turbine engine based on detecting the one or more faults by the one or more management systems, wherein the two or more stall margin adjustment parameters comprise an adjustment to an acceleration schedule or a use of another reference acceleration schedule of the gas turbine engine and an adjustment to an engine bleed schedule or a use of another reference bleed schedule of the gas turbine engine; and
adjusting operation of the hybrid engine based on the two or more stall margin adjustment parameters, wherein the adjustment to the acceleration schedule or the use of the another reference acceleration schedule and the adjustment to the engine bleed schedule or the use of the another reference bleed schedule are adjusted with respect to a reduced power augmentation level provided by the second electric motor.

12. The method of claim 11, wherein the one or more management systems comprise a thermal management system configured to monitor an operating temperature of a battery system, alternative power source system, and/or power electronics for the second electric motor, and the one or more faults comprise a thermal fault based on a temperature associated with the battery system, alternative power source system, and/or power electronics exceeding or approaching a temperature threshold, wherein the one or more management systems comprise a battery or alternative power source management system configured to monitor a voltage or current sourcing capability of the battery system or alternative power source system for the second electric motor, and the one or more faults comprise a battery fault based on the voltage or current sourcing capability of the battery or alternative power source system being below or approaching a power threshold, and wherein the one or more management systems comprise an electrical augmentation management system configured to monitor one or more capabilities of the second electric motor, and the one or more faults comprise an electrical augmentation fault based on at least one of the capabilities of the second electric motor not meeting a performance threshold.

13. The method of claim 11, wherein the adjustment to the acceleration schedule or the use of the another reference acceleration schedule is modulated based on an indication of a reduced performance capability from the one or more management systems.

14. The method of claim 11, wherein the adjustment to the engine bleed schedule or the use of the another reference bleed schedule is established based on an indication of a reduced performance capability from the one or more management systems.

* * * * *